United States Patent [19]
Matsuoka

[11] Patent Number: 5,289,313
[45] Date of Patent: Feb. 22, 1994

[54] OPTICAL HEAD USING SEMICONDUCTOR LASER ARRAY AS LIGHT SOURCE

[75] Inventor: Kazuhiko Matsuoka, Yokohama, Japan

[73] Assignee: Canon Kabushiki Kaisha, Tokyo, Japan

[21] Appl. No.: 965,624

[22] Filed: Oct. 22, 1992

Related U.S. Application Data

[63] Continuation of Ser. No. 413,474, Sep. 27, 1989, abandoned.

[30] Foreign Application Priority Data

Sep. 28, 1988 [JP] Japan ................ 63-240655

[51] Int. Cl.$^5$ ............................................. G02B 5/30
[52] U.S. Cl. ................................. 359/496; 369/110
[58] Field of Search ............... 350/402, 378, 401, 421;
351/212; 369/13, 44, 32, 45, 110, 44.14, 44.41,
44.37, 44.23, 112, 122, 44.32, 44.33, 44.38,
44.39; 250/201, 201.5; 359/496, 669, 495, 629,
641; 372/43, 50

[56] References Cited

U.S. PATENT DOCUMENTS

| | | | |
|---|---|---|---|
| 4,333,173 | 6/1982 | Yonezawa et al. | 250/201 |
| 4,520,472 | 5/1985 | Reno | 369/122 |
| 4,729,641 | 3/1988 | Matsuoka et al. | 350/348 |
| 4,741,920 | 5/1988 | Matsuoka et al. | 350/173 |
| 4,770,507 | 9/1988 | Arimoto et al. | 350/421 |
| 4,779,250 | 10/1988 | Kogure et al. | 369/13 |
| 4,822,151 | 4/1989 | Tatsuno et al. | 350/402 |
| 4,904,068 | 2/1990 | Tatsuno et al. | 350/421 |

FOREIGN PATENT DOCUMENTS 61-20057  1/1986  Japan .
61-206925  9/1986  Japan .

*Primary Examiner*—Bruce Y. Arnold
*Assistant Examiner*—James Phan
*Attorney, Agent, or Firm*—Fitzpatrick, Cella, Harper & Scinto

[57] ABSTRACT

An optical head using a semiconductor laser array as a light source comprises a semiconductor laser array in which a plurality of semiconductor lasers are linearly arrayed, a collimator lens, an objective lens and a beam shaping prism system. The beam shaping prism system is arranged between the collimator lens and the objective lens to convert a beam width of a beam emerged from the collimator lens. The junction surfaces of the semiconductor lasers are parallel with an array direction. A plane defined by incident and emerging beams on and from the beam shaping prism system is parallel with or overlapping the array direction of the semiconductor lasers.

40 Claims, 4 Drawing Sheets

OPTICAL HEAD USING SEMICONDUCTOR LASER ARRAY AS LIGHT SOURCE

This application is a continuation of application Ser. No. 07/413,474, filed Sep. 27, 1989, now abandoned.

BACKGROUND OF THE INVENTION

The present invention relates to an optical head using a semiconductor laser (to be referred to as an LD hereinafter) as a light source and, more particularly, to an optical head using an LD array in which a plurality of LDs are linearly arrayed as a light source.

Conventionally, many proposals have been made about a method of optically recording/reproducing data on/from a data recording medium using an optical head having an LD array as a light source. For example, Japanese Patent Publication Nos. 57-60697, 58-56164, 59-9976, 59-18772, and 61-20057 are known.

FIG. 1 shows a structure of an optical head shown in an embodiment of Japanese Patent Publication No. 61-20057. A description will be made along the propagation of a light beam. Divergent light beams emitted from an LD array 102 having a plurality of light-emitting points $101_1$, $101_2$, and $101_3$ are collimated by a collimator lens 103. These light beams pass through polarizing beam splitter 104 and a λ/4 (quarter wavelength plate 105, and then form small spots $108_1$, $108_2$, and $108_3$ on a recording surface 109 of a recording medium 107 by an objective lens 106. The light beams reflected by the recording surface 109 pass through the objective lens 106 and the λ/4 plate 105. Since the light beams reciprocate through the λ/4 plate 105, they are reflected by the polarizing beam splitter 104, and then are converged on a light-receiving element 111 by a focusing lens 110.

Various applications of functions and roles of the plurality of small spots 108 on the recording surface 109 can be proposed. For example, assume that the recording medium 107 is moved in a direction of an arrow A in FIG. 1 relative to an optical head. The small spot $108_2$ is used for recording data, and the small spot $108_3$ is used for auto focus control and auto tracking control and for reproducing recorded data. The small spot $108_1$ is used for preheating a recording region or for detecting a defect or dust on the surface of the recording medium 107. These functions are realized by arranging light-receiving portions corresponding in number to the small spots 108 on the light-receiving element 111 and detecting a variation in light amount of each light beam. In the above description, the function of each small spot 108 is merely an example, and other applications may be adopted.

However, there are the following drawbacks upon employment of an optical head using an LD array as a light source having the structure shown in FIG. 1. In general, auto focus control and auto tracking control techniques are necessary for accurately recording or reproducing data on/from a predetermined position on the recording surface 109 of the recording medium 107. For this purpose, the objective lens 106 is moved to be perpendicular to or parallel to the recording surface 109 of the recording medium 107. Therefore, the objective lens 106 is required to be lightweight and compact. In consideration of this requirement, a double-aspherical single lens having a focal length fo of about 4 to 5 mm has been developed for an objective lens. In order to increase a recording density, each small spot 108 on the recording surface 109 is required to have a spot size of about 1.5 μm. For this purpose, the objective lens 106 must have a feature of a very bright lens, i.e., have a numerical aperture (NA) of about 0.5. When the objective lens 106 of such specifications is designed, it is important to correct spherical aberration, an coma, and an astigmatism. However, in the optical head shown in FIG. 1, light components on and outside the optical axis, i.e., a plurality of small spots $108_1$ to $108_3$ must be satisfactorily focused on an identical plane, i.e., the recording surface 109. Therefore, correction of curvature of field must be taken into account in addition to the aberrations.

Optical components used in an optical head are designed to have a target R.M.S. value (Root Mean Square) of 0.07λ or less of a total wavefront aberration of the optical components between the light source and the recording surface according the Strehl definition (λ is the wavelength of an LD).

In the above specifications, a field angle of the objective lens 106 which can satisfy the above definition is about 0.5°. Therefore, if the focal length fo of the objective lens 106 is 4.5 mm, an interval l between adjacent small spots $108_1$ and $108_2$ on the recording surface has an upper limit of about 40 μm.

The interval l is preferably as large as possible as long as focusing performance is not impaired. The reason for this is as follows. For example, as described above, when auto focus control and auto tracking control are performed using the small spot $108_3$, if there is a considerably large amount of dust on the surface of the recording medium 107, it is impossible to perform accurate control using the spot $108_3$. In an extreme case, an erroneous recording operation may be performed by the spot $108_2$ at a position other than desired. In order to prevent such an erroneous operation, a change in light amount of the spot $108_1$ is detected to detect the presence of dust or the like in advance. An auto focus mechanism and an auto tracking mechanism (neither are shown) are fixed in position for a predetermined period of time, and are restarted later. Therefore, a given processing time is required after dust or the like is detected by the spot $108_1$ until the fixing operation of the mechanisms is started. For this reason, the interval l is preferably at large as possible.

Points to be noted about an interval p between the adjacent light-emitting points 101 in the LD array 102 will now be pointed out. As a form of the LD array 102, a hybrid type in which a plurality of independent LDs are linearly arrayed and fixed in a single package and a monolithic type in which a plurality of light-emitting points 101 capable of being independently driven are formed by an identical semiconductor substrate are known. In the former type, the interval p between a plurality of light-emitting points 101 is preferably large in view of an array packaging technique. In the latter type, a problem of thermal crosstalk, i.e., a problem that a signal for driving the light-emitting point $101_1$ leaks to influence the adjacent light-emitting point $101_2$, is posed. In order to avoid this problem, the interval l between adjacent light-emitting points is set to be at least 100 μm or more, and is preferably set to be 150 μm or more.

To summarize the above preferred requirements, a focal length fc of a preferred collimator lens 103 is determined. That is, $$fc = p \cdot fo / l \qquad (1)$$

$f_o = 4.5$ mm, $l = 40$ μm, and $p = 150$ μm are substituted in this equation to yield $f_c = 16.875$ mm.

However, when the collimator lens 103 having such a long focal length is used, the dimensions of the entire optical head are increased, and its weight becomes heavy. Therefore, such a structure disturbs a high-speed access operation of the entire optical head.

In the arrangement of the optical head shown in FIG. 1, a near-field shape of the light-emitting point 101 is directly projected onto the recording surface 109, and the small spot 108 has an elliptical or oval shape, and is not preferable for a requirement of high recording density.

FIG. 2 is a block diagram of an optical recording/reproducing apparatus described in an embodiment of Japanese Patent Laid-Open (Kokai) No. 61-206925. The apparatus shown in FIG. 2 is constituted by a semiconductor laser array 201, a collimator lens 202, an expanding prism 203, a polarization prism 204, a λ/4 plate 205, a converging lens 206, a disk 207, lenses 208 and 209 for converging a beam from the polarization prism 204, and a photosensor 210.

However, Japanese Patent Laid-Open (Kokai) No. 61-206925 merely describes that the semiconductor laser array and the expanding prism are used, and has no description about a detailed arrangement condition of the semiconductor laser array and the prisms for shaping a beam.

SUMMARY OF THE INVENTION

It is an object of the present invention to provide a compact and simple optical head which can eliminate the conventional drawbacks and has good characteristics.

In the present invention, a beam shaping prism is adopted in an optical head using an LD array as a light source in a preferred arrangement to eliminate the conventional drawbacks while paying attention to a beam shape conversion function of a beam shaping prism and a function about an angular magnification of an afocal system.

In order to achieve the object of the present invention, there is provided an optical head comprising at least an LD array, a collimator lens, and an objective lens, wherein a beam shaping prism is arranged between the collimator lens and the objective lens, a plurality of light-emitting portions (LDs) in the LD array are arrayed in a plane parallel to or overlapping a plane defined by incident and emerging beams associated with the beam shaping prism, and a junction surface of each of the plurality of LDs in the LD is arranged so as to be parallel with an array direction of the plurality of LDs.

DESCRIPTION OF THE PREFERRED EMBODIMENTS

An optical head using an LD array as a light source according to the present invention will be described in detail below with reference to the accompanying drawings, A beam shape conversion function of a beam shaping prism according to the present invention will be explained below with reference to FIG. 3.

Figure 3:
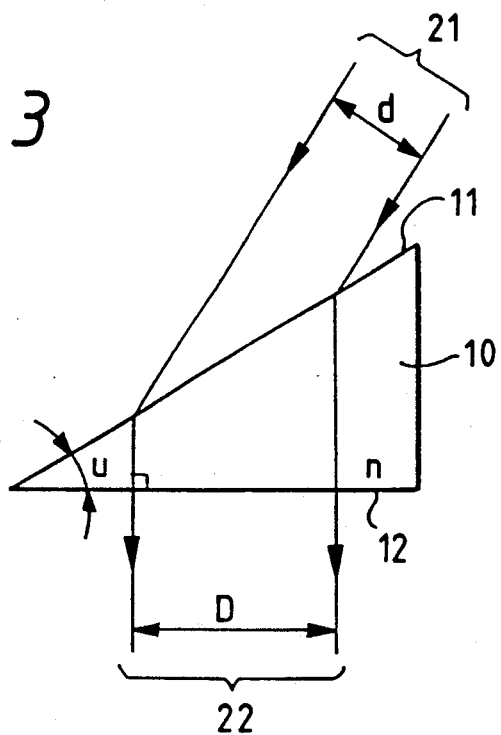
FIG. 3 is a view for explaining a beam shape conversion function of a beam shaping prism according to the present invention.

In FIG. 3, a beam shaping prism 10 has a surface 11 (first surface) on the side of a light source, and a surface 12 (second surface) on the side of an objective lens. FIG. 3 exemplifies a case wherein a collimated incident beam 21 having a width d is refracted by the first surface 11, vertically passes through the second surface 12, and is then converted to a collimated emerging beam 22 having a width D. When a refractive index of the prism 10 is represented by n and an angle defined by the first surface 11 as an incident surface and the second surface 12 as an emerging surface is represented by u, a conversion ratio γ of a beam spot size is expressed by equation (2):

$$\gamma = D/d = \sqrt{\cos 2u/(1 - n^2 \sin^2 u)} \qquad (2)$$

Figure 4:
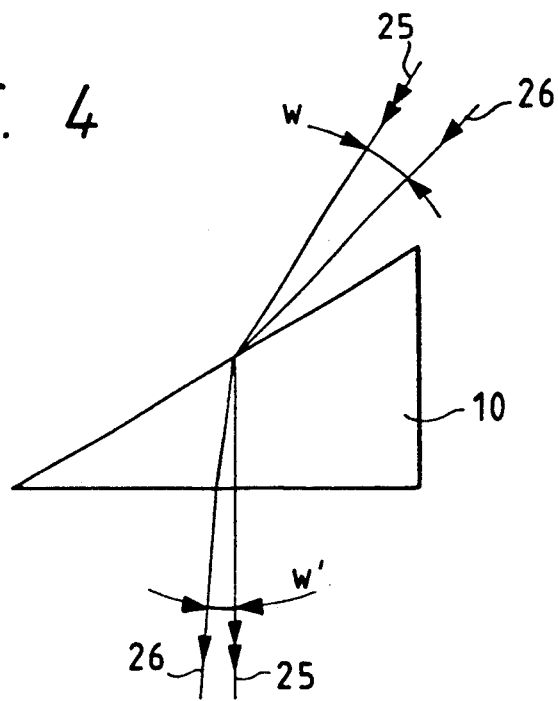
FIG. 4 is a view for explaining a function about an angular magnification of an afocal system of the beam shaping prism according to the present invention.

A function associated with an angular magnification of an afocal system of the beam shaping prism 10 will be described below with reference to FIG. 4. A small angle w defined by a given beam 25 passing through the prism 10 and a beam 26 and an angle w' defined by their emerging directions have the following relationship using the above-mentioned conversion ratio γ:

$$\gamma \approx w/w' \qquad (3)$$

Figure 5:
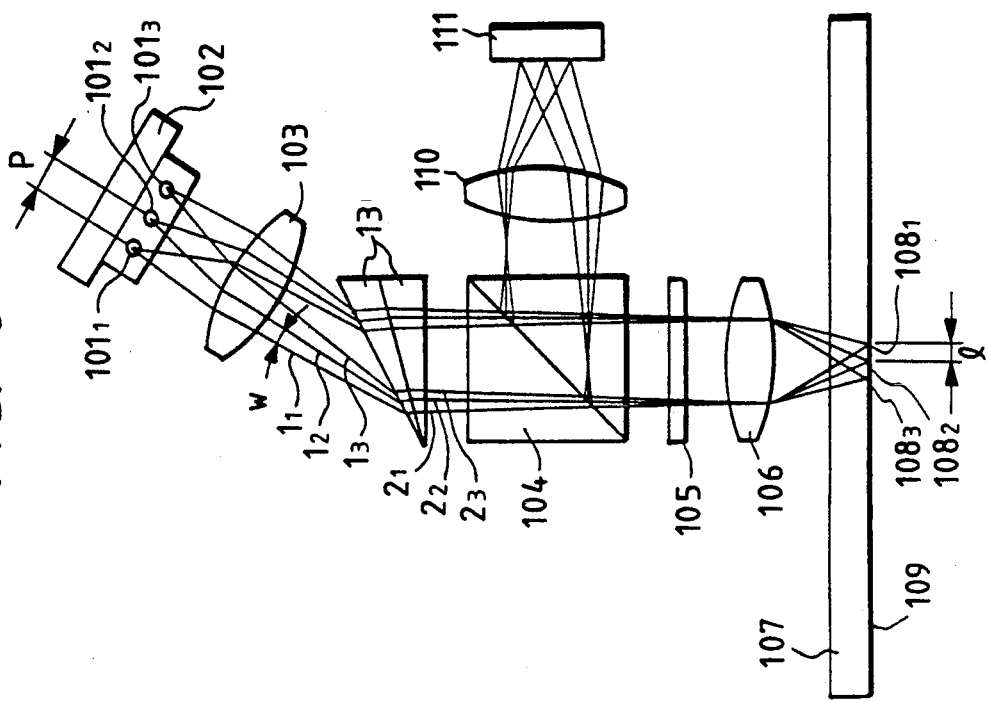
FIG. 5 is a view for explaining an embodiment of an optical head using an LD array as a light source according to the present invention.

FIG. 5 illustrates a structure of an embodiment of an optical head according to the present invention. The same reference numerals in FIG. 5 denote parts having the same functions as in FIG. 1.

In FIG. 5, divergent beams emitted from light-emitting points $101_1$, $101_2$, and $101_3$ as a plurality of LDs which are linearly arrayed are converted to collimated beams $1_1$, $1_2$, and $1_3$ by a collimator lens 103. If an interval between the light-emitting points $101_1$ and $101_2$ and an interval between the light-emitting points $101_2$ and $101_3$ are equal to each other and are represented by p, an angle defined by the collimated beams $1_1$ and $1_2$ and an angle defined by the collimated beams $1_2$ and $1_3$ are equal to each other and are represented by w. If the focal length of the collimator lens 103 is represented by fc and w is a small value, the angle w can be approximately expressed by:

$$w = p/fc \qquad (4)$$

The collimated beams 1 become incident on the beam shaping prism 10 whose functions have been described with reference to FIGS. 3 and 4, and are then refracted by and pass through the prism. As a result, the beams emerge from the prism 10 as collimated beams $2_1$, $2_2$, and $2_3$. As can be seen from the descriptions of equations (2) and (3), the beam size of the emerging beam 2 is expanded to $\gamma$ times in a plane defined by the incident and emerging beams 1 and 2, i.e., in the surface of the drawing of FIG. 5, and an angle w' defined by the emerging beams $2_1$ and $2_2$ and by the beams $2_2$ and $2_3$ is reduced to $1/\gamma$ of the angle w defined by their corresponding incident beam. Thereafter, the emerging beams 2 are converged by an objective lens 106 via a polarizing beam splitter 104 and a $\lambda/4$ plate and form, small spots $108_1$, $108_2$, and $108_3$ on a recording surface 109 of a recording medium 107. An interval l between the small spots $108_1$ and $108_2$ or an interval l between the spots $108_2$ and $108_3$ is approximately expressed by:

$$l = fo \, w' \quad (5)$$

where fo is the focal length of the objective lens 106. The light beams reflected by the recording surface 109 are focused on the corresponding light-receiving portions on a light-receiving element 111 by a converging lens 110 as in the description made with reference to FIG. 1.

The effect of the beam shaping prism 10 will be explained below using numerical values. For the above-mentioned reason, the interval between the adjacent small spots 108 is preferably set to be about 40 $\mu$m. If fo=4.5 mm, w' is about 0.5° from equation (5). If the conversion ratio of the beam shaping prism 10 is set to be $\gamma$=2.4, the angle w formed by incident beams to the prism 10 is to be 1.2° by the equation (3). Therefore, if the interval p of the light-emitting points 101 of an LD array 102 is set to be 150 $\mu$m, the focal length fc of the collimator lens 103 is approximately given by:

$$fc = p/w \quad (6)$$

Therefore, fc=7.2 mm.

More specifically, the beam shaping prism 10 is arranged in an optical path between the collimator lens 103 and the objective lens 106. The array direction of the plurality of light-emitting points 101 in the LD array 102 as the light source is arranged in a plane defined by the incident and emerging beams 1 and 2 on/from the beam shaping prism 10, i.e., in the surface of the drawing of FIG. 5 or in a plane parallel to the surface of the drawing. The beam shaping prism 10 is arranged to expand the incident beams 1 in the surface of the drawing. Furthermore, the junction surface of each LD as the light-emitting point 101 is present in the surface of the drawing or to be parallel to the surface of the drawing. To satisfy such an arrangement, as described above, the focal length of the collimator lens 103 can be shortened, and a compact and lightweight optical head can be realized. In addition, the small spots on the recording surface can have a circular shape. In addition, the interval between adjacent light-emitting points 101 can be widened. Thus, easy packaging is allowed in a hybrid type LD array, and crosstalk between the adjacent light-emitting points 101 can be prevented in a monolithic type LD array. The spot interval l on the recording surface 109 can be widened while maintaining good focusing performance, and a load on an electrical processing system can be reduced. As a result, a relative moving speed between the optical head and the recording medium 107 can be increased. Therefore, a high-speed recording or reproducing operation can be assured. In addition, in this embodiment, since the angle w' defined by the emerging beams 2 is increased as much as possible, the interval between light beams on the light-receiving element 111 can be assured without unnecessarily increasing the focal length of the focusing lens 110. Therefore, crosstalk between electrical outputs from the light-receiving element 111 caused by partial overlapping of the beam $2_2$ on the light-receiving portion corresponding to the beam $2_1$ can be prevented while guaranteeing compact and lightweight features.

Figure 2:
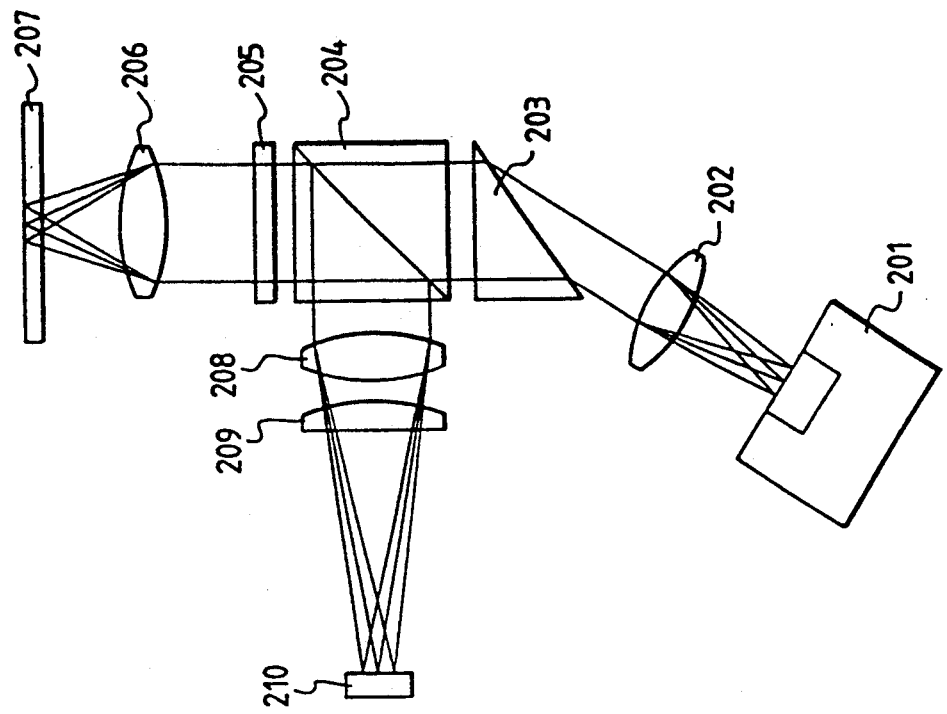
FIG. 2 is a block diagram of an optical recording/reproducing apparatus described in an embodiment of Japanese Patent Laid-Open (Kokai) No. 61-206925.
Figure 1:
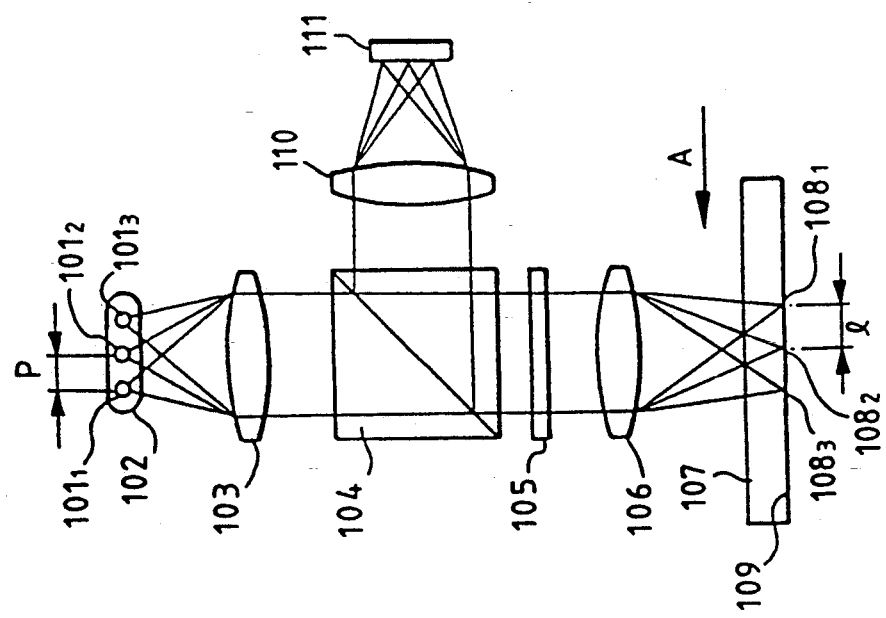
FIG. 1 is a view showing a structure of an optical head described in an embodiment of Japanese Patent Publication No. 61-20057.

In the arrangement of an optical head shown in FIG. 1, a near-field shape of each light-emitting point 101 is directly projected onto the recording surface 109, and each small spot 108 has an elliptical or oval shape. According to this embodiment, however, the small spots $108_1$ to $108_3$ can have a substantially circular shape by satisfying conditions of the positional relationship between the junction surfaces and the array direction of the LDs, and the positional relationship between the array direction of the LDs and the beam shaping prism 10.

Under another preferable condition of the present invention, the arrangement conditions are satisfied, and the conversion ratio $\gamma$ is set to satisfy the following relation:

$$1.4 \leq \gamma \leq 3.5 \quad (7)$$

This relation is derived in consideration of the fact that the full angle at half maximum in a direction parallel to the junction surface of the divergence angle of an existing LD is about 8° to 15° ($\theta \parallel$) and that in a direction perpendicular to the junction surface is about 21° to 32° ($\theta \perp$). When the conversion ratio is decreased below the lower limit of relation (7), the effect of the short focal length fc of the collimator lens 103 is weakened, and the shape of each small spot 108 on the recording surface 109 deviates from a circle. Contrary to this, if the conversion ratio exceeds the upper limit of relation (7), a loss of a light amount becomes too large, and the shape of each small spot 108 deviates from a circle.

Another embodiment of the present invention will be described below. A case will be exemplified wherein a recording medium 107 is moved in a direction perpendicular to the surface of the drawing relative to an optical head having a structure shown in FIG. 5. In this case, the following application can be made. That is, a small spot $108_2$ on a recording surface 109 is used for auto focus control and auto tracking control, and spots $108_1$ and $108_3$ are independently modulated to simultaneously record two lines. In a reproducing mode, these spots are used for simultaneously reproducing two lines. However, as one the of characteristics of an LD, an oscillation wavelength varies in accordance with a change in temperature. Therefore, when an oscillation wavelength varies between recording and reproducing modes, an angle defined by emerging beams $2_1$ and $2_2$ from a prism and an angle w' defined by beams $2_2$ and $2_3$ may vary between the recording and reproducing modes due to the divergence characteristics of the material of a beam shaping prism 10. Therefore, from the relationship expressed by equation (5), an interval l of the spots on the recording surface 109 varies between the recording and reproducing modes. Although accurate auto tracking control is performed using the spot $108_2$, the reproducing spots $108_1$ and $108_3$ reproduce a recorded data string on the recording surface in a slightly offset state in the reproducing mode. In particular, an LD array suffers from a variation in wavelength caused by a change in temperature of each light-emitting point, and an interval of spots also varies depending on a change in temperature.

Figure 6:
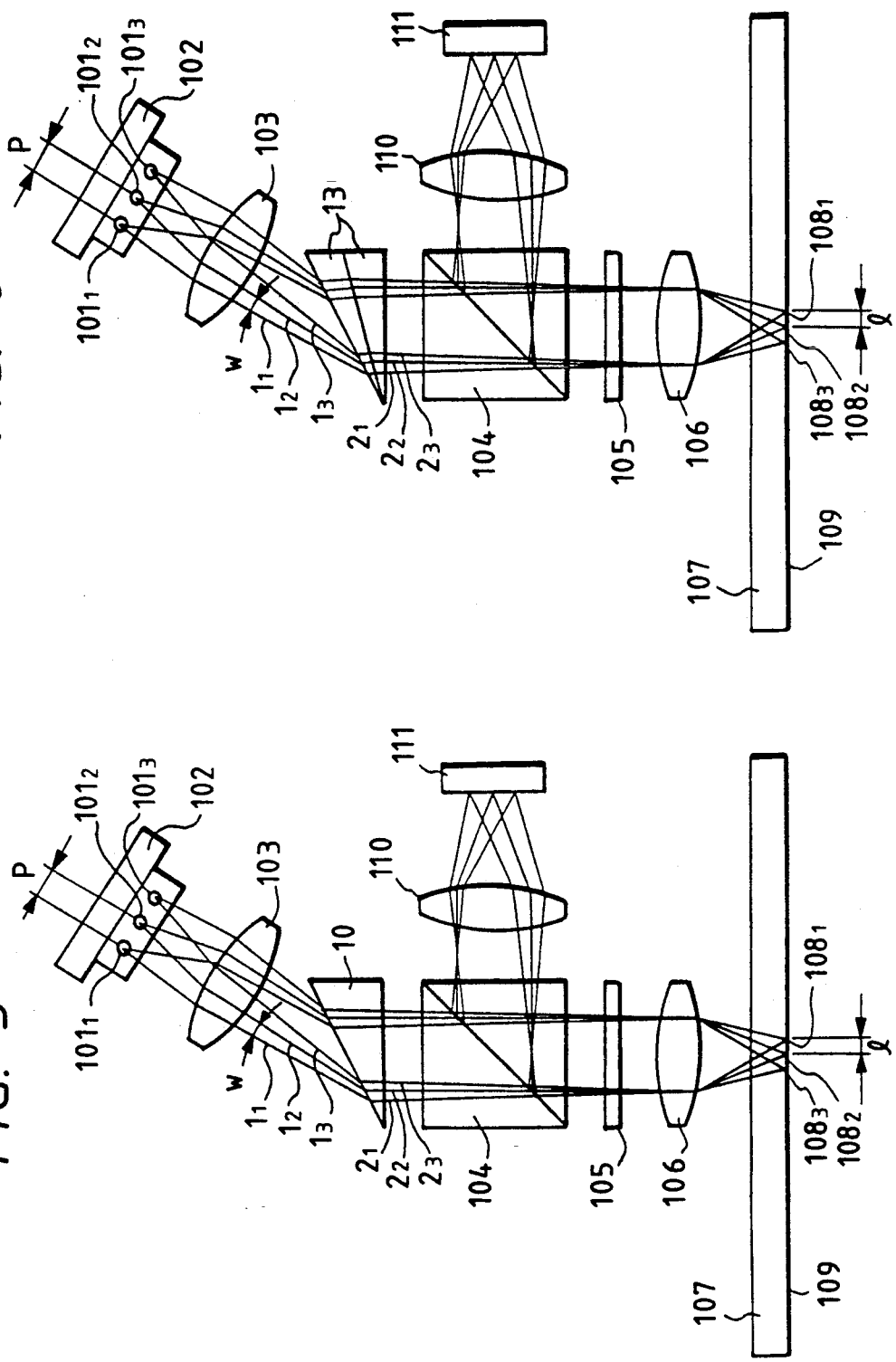
FIG. 6 is a view for explaining another embodiment of an optical head using an LD array as a light source according to the present invention.
Figure 7:
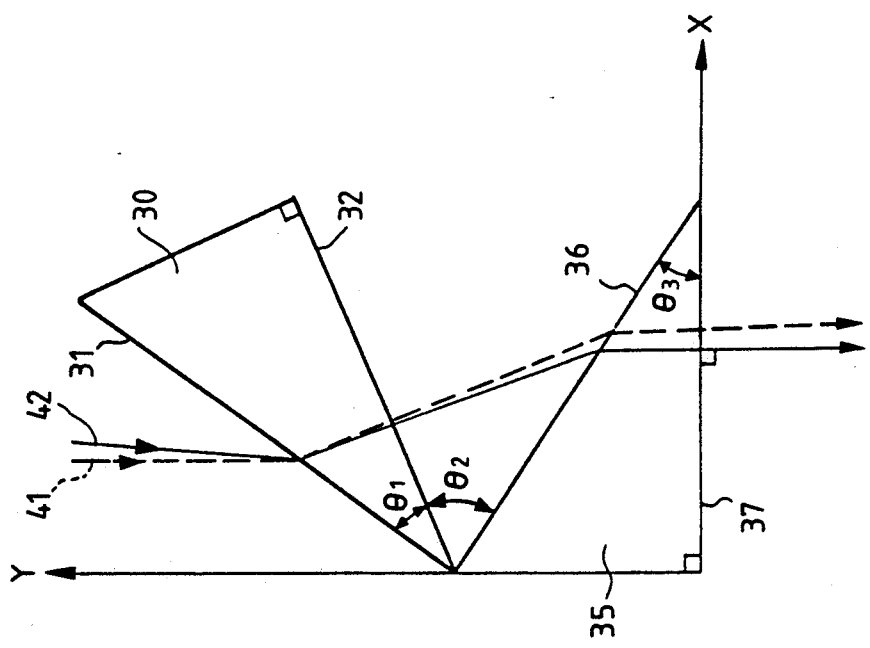

In order to solve this problem, the beam shaping prism 10 is constituted by a plurality of prisms. FIG. 6 illustrates a structure of an optical head using an LD array and a plurality of prisms 13. The same reference numerals in FIG. 6 denote the parts having the same functions as in the embodiment of FIG. 5, and a detailed description thereof will be omitted. The positional relationship between the junction surfaces of LDs and the array direction of the LDs, and the positional relationship between the array direction of the LDs and the plurality of prisms 13 for shaping beams are the same as those in the embodiment shown in FIG. 5. FIG. 7 shows an embodiment of a beam shaping prism system suitable for achieving this object. A first prism 30 is a glass material having a refractive index of 1.62004 with respect to a d-line and an Abbe's number of 36.3, and an angle $\theta 1$ defined by first and second surfaces 31 and 32 is 31°11'. A second prism 35 is a glass material having a refractive index of 1.51633 with respect to a d-line and an Abbe's number of 64.1, and an angle $\theta 3$ defined by third and fourth surfaces 36 and 37 is 33°57'. An angle $\theta 2$ defined by the second and third surfaces 32 and 36 is set to be 57°28'. The glass material of the first prism 30 exhibits refractive indices of 1.60738 and 1.60707 with respect to a typical wavelength of 830 nm of an LD and a varied wavelength 840 nm caused by the variation in output, respectively, while the glass material of the second prism 35 exhibits the refractive indices of 1.50974 and 1.50956 respectively. In an X-Y coordinate system provided for the sake of descriptive convenience in FIG. 7, a beam 41 which has a wavelength of 830 nm and is parallel to the Y-axis, as indicated by a broken line, and a beam 42 which forms an angle of 1°37' with the beam 41 and has a wavelength of 830 nm, as indicated by a solid line will be examined below.

From calculations using Snell's law, the beam 42 emerges almost perpendicular to the X-axis. On the other hand, the beam 41 emerges to form an angle of 0.68492° with respect to the beam 42. From equation (3), the conversion ratio of the beam shaping prism system shown in FIG. 7 is $\gamma=2.4$. Assuming a case wherein the wavelength of the beam 41 indicated by the broken line fluctuates to 840 nm, the beam 41 is calculated to emerge forming an angle of 0.68515° with respect to the beam 42 by the similar calculations. Therefore, from equation (5), the interval l of small spots on a recording surface 109 varies from 53.796 μm to 53.814 μm, i.e., by only 0.02 μm. Since the spot size is about 1.5 μm, almost no influence need be considered.

Figure 8:
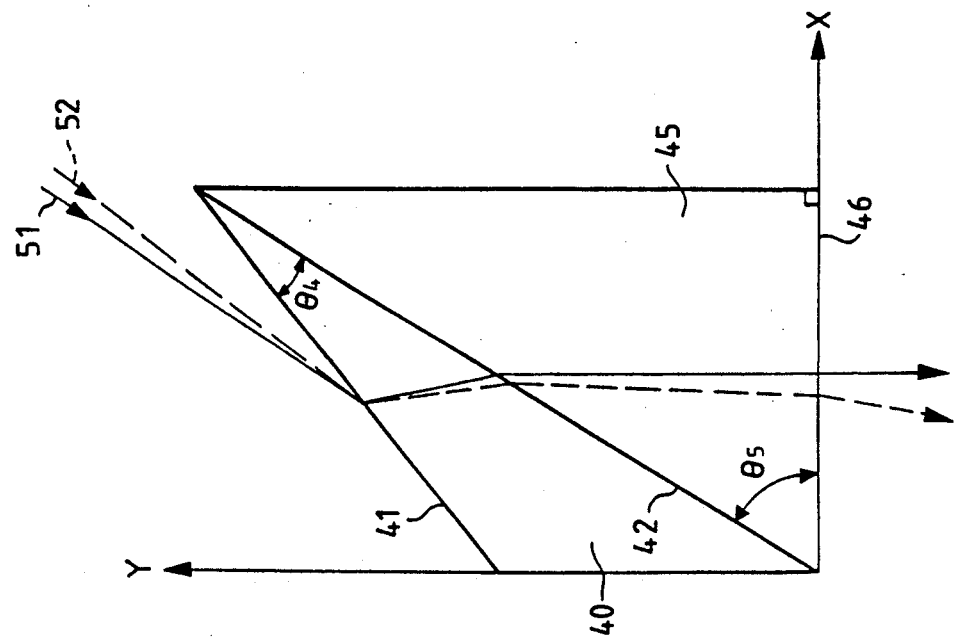
FIGS. 7 and 8 are views for explaining a beam shaping prism system used in an optical head using an LD array as a light source according to the present invention.

FIG. 8 shows still another embodiment having an effect for the above-mentioned problem. In this embodiment, a beam shaping prism system has an integrated structure constituted by bonding first and second prisms 40 and 45. The first prism 40 is a glass material having a refractive index of 1.78472 with respect to a d-line and an Abbe's number of 25.7, and an angle $\theta 4$ defined by a first surface 41 and a second surface 42 as a bonding surface is 18°42'. The second prism 45 is a glass material having a refractive index of 1.62299 with respect to a d-line and an Abbe's number of 58.2, and an angle $\theta 5$ defined by the second surface 42 and a third surface 46 is 58°42'. The refractive indices of the glass materials of the first and second prisms 40 and 45 are respectively 1.76307 and 1.61451 with respect to a wavelength of 830 nm, and are respectively 1.76255 and 1.61428 with respect to a wavelength of 840 nm.

In the beam shaping prism system shown in FIG. 8, a beam 51 of a wavelength of 830 nm incident at an angle of 72°42' (indicated by a solid line) with respect to a normal to the first surface 41 emerges almost perpendicularly to the X-axis. On the other hand, a beam 52 of a wavelength of 830 nm incident at an angle of 74° (indicated by a broken line) with respect to a normal to the first surface 41 emerges to form an angle of 0.53642° with respect to the beam 51. Therefore, a conversion ratio of this embodiment is $\gamma=2.4$. When the wavelength of the beam 52 indicated by the broken line fluctuates to 840 nm, the beam 52 emerges to form an angle of 0.53616° with respect to the beam 51. Therefore, from equation (5), an interval l of small spots on a recording surface 109 varies from 42.132 μm to 42.111 μm, i.e., by only 0.02 μm, thus posing no problem.

As described above, according to the optical head using an LD array as a light source of the present invention, a beam shaping prism is arranged between a collimator lens and an objective lens, and a plane defined by incident and emerging beams on/from the beam shaping prism is set to be parallel to or overlap an array direction of a plurality of light-emitting portions in the LD array. In addition, junction surfaces of a plurality of LDs in the LD array are set to be parallel to the array direction of the LDs. Thus, a lightweight, compact optical head can be realized by a simple structure, and good optical performance and a good light-receiving portion output can be assured.

What is claimed is:

1. An optical head using a semiconductor laser array as a light source, comprising:
   a semiconductor laser array, in which a plurality of semiconductor lasers, each having a junction surface, are linearly arrayed, with said junction surfaces of said semiconductor lasers being parallel to an array direction, wherein the divergence angle of each of said plurality of semiconductor lasers constituting said semiconductor laser array is set such that the full angle at half maximum in a direction parallel to the junction surface is 8° to 15° and the full angle at half maximum in a direction perpendicular to the junction surface is 21° to 32°;
   a collimator lens for converting a plurality of light beams emitted from said semiconductor laser array into a plurality of collimated light beams;
   a beam shaping prism system for converting a beam width of the plurality of beams emerging from said collimator lens, with a plane defined by incident and emerging beams on and from said beam shaping prism system being parallel to or overlapping the array direction of said semiconductor lasers, said beam shaping prism system comprising a plurality of beam shaping prisms, wherein when the width of an incident beam on said beam shaping prism system is represented by d, the width of an emerging beam is represented by D, and the conversion ratio $\gamma$ of the beam width is defined by $\gamma=D/d$, the following condition is satisfied:

$1.4 \leq \gamma \leq 3.5$; and an objective lens for converging the plurality of beams emerging from said beam shaping prism system.

2. An optical head according to claim 1, wherein said plurality of prisms are arranged in a single body.

3. An optical head according to claim 1, wherein said plurality of prisms are formed by combining prisms made of different glass materials.

4. An optical head according to claim 1, wherein an emerging angle of a beam from said plurality of prisms is almost constant even if a wavelength of the beam from said semiconductor laser array varies.

5. An optical head according to claim 4, wherein said plurality of prisms are formed of combined prisms made of different glass materials.

6. An optical head according to claim 1, wherein said plurality of prisms are arranged as a single unit.

7. An optical head according to claim 1, wherein said plurality of prisms are formed of combined prisms made of different glass materials.

8. An optical head according to claim 1, wherein an emerging angle of a beam from said plurality of prisms is almost constant even if a wavelength of the beam from said semiconductor laser array varies.

9. An optical head according to claim 8, wherein said plurality of prisms are formed of combined prisms made of different glass materials.

10. An optical head using a semiconductor laser array as a light source, comprising:
a semiconductor laser array comprising a plurality of semiconductor lasers each having a junction surface, wherein the divergence angle of each of said plurality of semiconductor lasers constituting said semiconductor laser array is set such that the full angle at half maximum in a direction parallel to the junction surface is 8° to 15° and the full angle at half maximum in a direction perpendicular to the junction surface is 21° to 32°;
a collimator lens for converting a plurality of beams emitted from said semiconductor laser array into a plurality of collimated beams;
a beam shaping prism system for converting a beam width of a plurality of beams emerging from said collimator lens, said beam shaping system prism comprising a plurality of prisms, wherein when the width of an incident beam on said beam shaping prism system is represented by d, the width of an emerging beam is represented by D, and the conversion ratio $\gamma$ of the beam width is defined by $\gamma = D/d$, the following condition is satisfied:

$$1.4 \leq \gamma \leq 3.5; \text{ and}$$

an objective lens for converging said plurality of beams emerging from said beam shaping prism system.

11. An optical head according to claim 10, wherein said semiconductor laser array includes a plurality of semiconductor lasers which are linearly arrayed, and a plane defined by incident and emerging beams on and from said beam shaping prism is parallel to or overlaps an array direction of said semiconductor lasers.

12. An optical head according to claim 10, wherein an emerging angle of a beam from said plurality of prisms is almost constant even if a wavelength of the beam from said semiconductor laser array varies.

13. An optical head according to claim 12, wherein said plurality of prisms are formed of combined prisms made of different glass materials.

14. An optical head according to claim 10, wherein said plurality of prisms are arranged as a single unit.

15. An optical head according to claim 10, wherein said plurality of prisms are formed of combined prisms made of different glass materials.

16. An optical head using a semiconductor laser array as a light source, comprising:
a semiconductor laser array, in which a plurality of semiconductor lasers, each having a junction surface, are linearly arrayed, with said junction surfaces of said semiconductor lasers being parallel to an array direction, wherein the divergence angle of each of said plurality of semiconductor lasers constituting said semiconductor laser array is set such that the full angle at half maximum in a direction parallel to the junction surface is 8° to 15° and the full angle at half maximum in a direction perpendicular to the junction surface is 21° to 32°;
a collimator lens for converting a plurality of beams emitted from said semiconductor laser array into a plurality of collimated beams;
a beam shaping prism system for converting a beam width of the plurality of beams emerging from said collimator lens, with a plane defined by incident and emerging beams on and from said beam shaping prism system being parallel to or overlapping the array direction of said semiconductor lasers, said beam shaping prism system comprising a plurality of prisms, wherein when the width of an incident beam on said beam shaping prism system is represented by d, the width of an emerging beam is represented by D, and the conversion ratio $\gamma$ of the beam width is defined by $\gamma = D/d$, the following condition is satisfied:

$$1.4 \leq \gamma \leq 3.5;$$

an objective lens for converging the plurality of beams emerging from said beam shaping prism system;
a beam splitter provided between said collimator lens and said objective lens; and
light receiving means for receiving a plurality of beams which are separated from the plurality of beams directed to said objective lens by said beam splitter.

17. An optical head according to claim 16, wherein an emerging angle of a beam from said plurality of prisms is almost constant even if a wavelength of the beam from said semiconductor laser array varies.

18. An optical head according to claim 16, wherein said plurality of prisms are arranged as a single unit.

19. An optical head according to claim 16, wherein said plurality of prisms are formed of combined prisms made of different materials.

20. An optical head according to claim 16, wherein an emerging angle of a beam from said plurality of prisms is almost constant even if a wavelength of the beam from said semiconductor laser array varies.

21. An optical head according to claim 20, wherein said plurality of prisms are formed of combined prisms made of different glass materials.

22. An optical head according to claim 16, wherein said plurality of prisms are arranged as a single unit.

23. An optical head according to claim 16, wherein said plurality of prisms are formed of combined prisms made of different glass materials.

24. An optical head using a semiconductor laser array as a light source, comprising:
- a semiconductor laser array comprising a plurality of semiconductor lasers each having a junction surface, wherein the divergence angle of each of said plurality of semiconductor lasers constituting said semiconductor laser array is set such that the full angle at half maximum in a direction parallel to the junction surface is 8° to 15° and the full angle at half maximum in a direction perpendicular to the junction surface is 21° to 32°;
- a collimator lens for converting a plurality of beams emitted from said semiconductor laser array into a plurality of collimated beams;
- a beam shaping prism system for converting a beam width of the plurality of beams emerging from said collimator lens, said beam shaping prism system comprising a plurality of prisms, wherein when the width of an incident beam on said beam shaping prism system is represented by d, the width of an emerging beam is represented by D, and the conversion ratio $\gamma$ of the beam width is defined by $\gamma = D/d$, the following condition is satisfied:

$$1.4 \leq \gamma \leq 3.5;$$

- an objective lens for converging said plurality of beams emerging from said beam shaping prism system;
- a beam splitter provided between said collimator lens and said objective lens; and
- light receiving means for receiving a plurality of beams which are separated from the plurality of beams directed to said objective lens by said beam splitter.

25. An optical head according to claim 24, wherein an emerging angle of a beam from said plurality of prisms is almost constant even if a wavelength of the beam from said semiconductor laser array varies.

26. An optical head according to claim 25, wherein said plurality of prisms are formed of combined prisms made of different glass materials.

27. An optical head according to claim 24, wherein said plurality of prisms are arranged as a single unit.

28. An optical head according to claim 24, wherein said plurality of prisms are formed of combined prisms made of different glass materials.

29. An optical head according to claim 24, wherein an emerging angle of a beam from said plurality of prisms is almost constant even if a wavelength of the beam from said semiconductor laser array varies.

30. An optical head according to claim 29, wherein said plurality of prisms are formed of combined prisms made of different glass materials.

31. An optical head according to claim 24, wherein said plurality of prisms are arranged as a single unit.

32. An optical head according to claim 24, wherein said plurality of prisms are formed of combined prisms made of different glass materials.

33. An optical head using a semiconductor laser array as a light source, comprising:
- a semiconductor laser array, in which a plurality of light emitting portions, each having a junction surface, are linearly arranged on the same substrate, with said junction surfaces of said light emitting portions being parallel to an array direction, wherein the divergence angle of each of said plurality of light emitting portions constituting said semiconductor laser array is set such that the full angle at half maximum in a direction parallel to the junction surface is 8° to 15° and the full angle at half maximum in a direction perpendicular to the junction surface is 21° to 32°;
- a collimator lens for converting a plurality of light beams emitted from said semiconductor laser array into a plurality of collimated beams;
- a beam shaping prism system for converting a beam width of a plurality of collimated beams emerging from said collimator lens, said beam shaping prism system comprising a plurality of prisms, wherein a plane defined by incident and emerging beams on and from said beam shaping prism system is parallel to or overlapping the array direction of said light emitting portions, and wherein when a width of a plurality of incident beams on said beam shaping prism system is represented by d, a width of a plurality of emerging beams is represented by D, and a conversion ratio $\gamma$ of the beam width is defined by $\gamma = D/d$, the following condition is satisfied:

$$1.4 \leq \gamma \leq 3.5;$$

- an objective lens for converging said plurality of beams emerging from said beam shaping prism;
- a beam splitter provided between said collimator lens and said objective lens; and
- light receiving means for receiving a plurality of beams which are separated from the plurality of beams directed to said objective lens by said beam splitter.

34. An optical head according to claim 33, wherein said beam shaping prism comprises a plurality of prisms arranged in a single body.

35. An optical head according to claim 33, wherein said beam shaping prism comprises a plurality of prisms formed by combining prisms made of different glass materials.

36. An optical head according to claim 33, wherein said beam shaping prism comprises a plurality of prisms, and wherein an emerging angle of a beam from said plurality of prisms is almost constant even if a wavelength of the beam from said semiconductor laser array varies.

37. An optical head using a semiconductor laser array as a light source, comprising:
- a semiconductor laser array, in which a plurality of light emitting portions, each having a junction surface, are linearly arranged on the same substrate, with said junction surfaces of said light emitting portions being parallel to an array direction, wherein the divergence angle of each of said plurality of light emitting portions constituting said semiconductor laser array is set such that the full angle at half maximum in a direction parallel to the junction surface is 8° to 15° and the full angle at half maximum in a direction perpendicular to the junction surface is 21° to 32°;
- a collimator lens for converting a plurality of light beams emitted from said semiconductor laser array into a plurality of collimated light beams;
- a beam shaping prism system for converting a beam width of the collimated beam emerging from said collimator lens, said beam shaping prism system comprising a plurality of prisms, wherein a plane defined by incident and emerging beams on and from said beam shaping prism system is parallel to or overlapping the array direction of said light emitting portions, wherein when the width of an incident beam on said beam shaping prism is represented by d, the width of an emerging beam is represented by D, and the conversion ratio $\gamma$ of the beam width is defined by $\gamma=D/d$, the following condition is satisfied:

$1.4 \leq \gamma \leq 3.5$; and an objective lens for converging the beams emerging from said beam shaping prism system.

38. An optical head according to claim 37, wherein said plurality of prisms are arranged in a single body.

39. An optical head according to claim 37, wherein said plurality of prisms are formed by combining prisms made of different glass materials.

40. An optical head according to claim 37, wherein said beam shaping prism comprises a plurality of prisms, and wherein an emerging angle of a beam from said plurality of prisms is almost constant even if a wavelength of the beam from said semiconductor laser array varies.

* * * * *

UNITED STATES PATENT AND TRADEMARK OFFICE
CERTIFICATE OF CORRECTION

PATENT NO. : 5,289,313
DATED : February 22, 1994
INVENTOR(S) : KAZUHIKO MATSUOKA It is certified that error appears in the above-indentified patent and that said Letters Patent is hereby corrected as shown below:

On the title page, item [56]: References Cited;
U.S. Patent Documents
"4,741,920 5/1988 Matsuoka et al." should read
--4,641,920 2/1987 Matsuoka et al.--.

Foreign Patent Documents
"61-20057 1/1986 Japan" should read
--61-20057 5/1986 Japan--.

Column 1,
Line 68, "a" should be deleted.

Column 2,
Line 6, "an" should be deleted.
Line 7, "an" should be deleted.
Line 18, "according" should read --according to--.
Line 45, "at" should read --as--.
Line 60, "interval 1" should read --interval p--.

Column 4,
Line 17, "ings," should read --ings.--.
Line 18, "beam shape" should read --beam-shape--.

Signed and Sealed this

Thirteenth Day of September, 1994

Attest:

BRUCE LEHMAN

Attesting Officer     Commissioner of Patents and Trademarks